US010649323B2

(12) United States Patent
Ogawa

(10) Patent No.: US 10,649,323 B2
(45) Date of Patent: May 12, 2020

(54) LIGHT SOURCE DEVICE AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/359,816

(22) Filed: Mar. 20, 2019

(65) Prior Publication Data
US 2019/0294036 A1 Sep. 26, 2019

(30) Foreign Application Priority Data

Mar. 26, 2018 (JP) .................................. 2018-058329

(51) Int. Cl.
*G03B 21/20* (2006.01)
*H04N 9/31* (2006.01)
*G03B 21/16* (2006.01)

(52) U.S. Cl.
CPC ....... *G03B 21/2066* (2013.01); *G03B 21/204* (2013.01); *G03B 21/2073* (2013.01); *H04N 9/312* (2013.01); *H04N 9/3158* (2013.01); *H04N 9/3167* (2013.01); *G03B 21/16* (2013.01)

(58) Field of Classification Search
CPC .............. G03B 21/204; G03B 21/2073; G03B 21/2066; H04N 9/3158; H04N 9/3161; H04N 9/3167
See application file for complete search history.

(56) References Cited

U.S. PATENT DOCUMENTS

2012/0242912 A1 9/2012 Kitano
2014/0354892 A1 12/2014 Kitano
2018/0217486 A1* 8/2018 Tanaka ................. G02B 27/283

FOREIGN PATENT DOCUMENTS

JP 2012212129 A 11/2012

* cited by examiner

*Primary Examiner* — Ryan D Howard
(74) *Attorney, Agent, or Firm* — Holtz, Holtz & Volek PC

(57) ABSTRACT

A light source device includes a light emitting element emitting light of a first wavelength band, a fluorescent wheel, a dichroic mirror, a reflection member and a polarization conversion element. The fluorescent wheel includes a fluorescent area converting the light of the first wavelength band into fluorescent light and a transmission area transmitting the light of the first wavelength band. The dichroic mirror reflects the light of the first wavelength band a first polarization direction, transmits the light in a second polarization direction, and transmits or reflects the fluorescent light. The reflection member reflects the light transmitted through the transmission area toward the transmission area. The polarization conversion element is disposed between the fluorescent wheel and the reflection member, transmits the lights transmitted through the transmission area and reflected by the reflection member, and converts the light in the first polarization direction into the second polarization direction.

20 Claims, 4 Drawing Sheets

US 10,649,323 B2

LIGHT SOURCE DEVICE AND PROJECTOR

CROSS-REFERENCE TO RELATED APPLICATION

This application is based on and claims priority under 35 USC 119 from Japanese Patent Application No. 2018-058329, filed on Mar. 26, 2018, the contents of which are incorporated herein by reference.

FIELD OF THE INVENTION

The present invention relates to a light source device and a projector including the light source device.

DESCRIPTION OF THE RELATED ART

Recently, data projectors are often used as imaging apparatuses for projecting screens of personal computers, video screens, images stored in memory-cards and the like, and so on onto screens. Such projectors concentrates light emitted from light sources on a display element called Digital Micromirror Device (DMD) or a liquid crystal panel, and display color images on a screen.

For example, JP-A-2012-212129 discloses a light source device which includes an excitation light source, a wheel provided with a phosphor layer, a dichroic mirror provided between the wheel and the excitation light source, and a polarization conversion element provided between the wheel and the dichroic mirror to change a polarization direction of the excitation light. The dichroic mirror transmits the excitation light from the excitation light source and guides the excitation light to the wheel, while reflecting light reflected by the wheel and guiding the light to an illumination optical system. It is also disclosed that the phosphor layer emits light of a red wavelength band and light of a green wavelength band.

However, in the light source device of JP-A-2012-212129, some of the excitation light incident on the red or green phosphor layer may be reflected to a dichroic mirror side without exciting a phosphor. Then, the polarization conversion element converts the polarization direction of the excitation light guided to an illumination optical system side by the wheel without exciting the phosphor, and the excitation light can be reflected by the dichroic mirror. Therefore, the excitation light is guided to the illumination optical system together with fluorescent light when the fluorescent light is emitted, and the color purity as light source light decreases due to color mixture.

The present invention has been made in view of the above points, and an object of the present invention is to provide a light source device having good color reproducibility with a simple configuration, and a projector.

SUMMARY OF THE INVENTION

According to one aspect of the disclosure, a light source device includes a light emitting element, a fluorescent wheel, a dichroic mirror, a reflection member and a polarization conversion element. The light emitting element is configured to emit light of a first wavelength band. The fluorescent wheel includes a fluorescent area configured to convert the light of the first wavelength band into fluorescent light and a transmission area configured to transmit the light of the first wavelength band. The fluorescent area and the transmission area are arranged side by side in a circumferential direction. The dichroic mirror is configured to reflect a component in a first polarization direction of the light of the first wavelength band emitted from the light emitting element, to transmit a component in a second polarization direction of the light of the first wavelength band, and to transmit or reflect the fluorescent light. The second polarization direction is orthogonal to the first polarization direction of the light of the first wavelength band. The reflection member is configured to reflect the light of the first wavelength band transmitted through the transmission area toward the transmission area. The polarization conversion element is disposed between the fluorescent wheel and the reflection member, configured to transmit the light of the first wavelength band transmitted through the transmission area and the light of the first wavelength band reflected by the reflection member, and configured to convert the light of the first wavelength band in the first polarization direction into the second polarization direction.

DETAILED DESCRIPTION OF THE PREFERRED EMBODIMENT

First Embodiment

Figure 1:
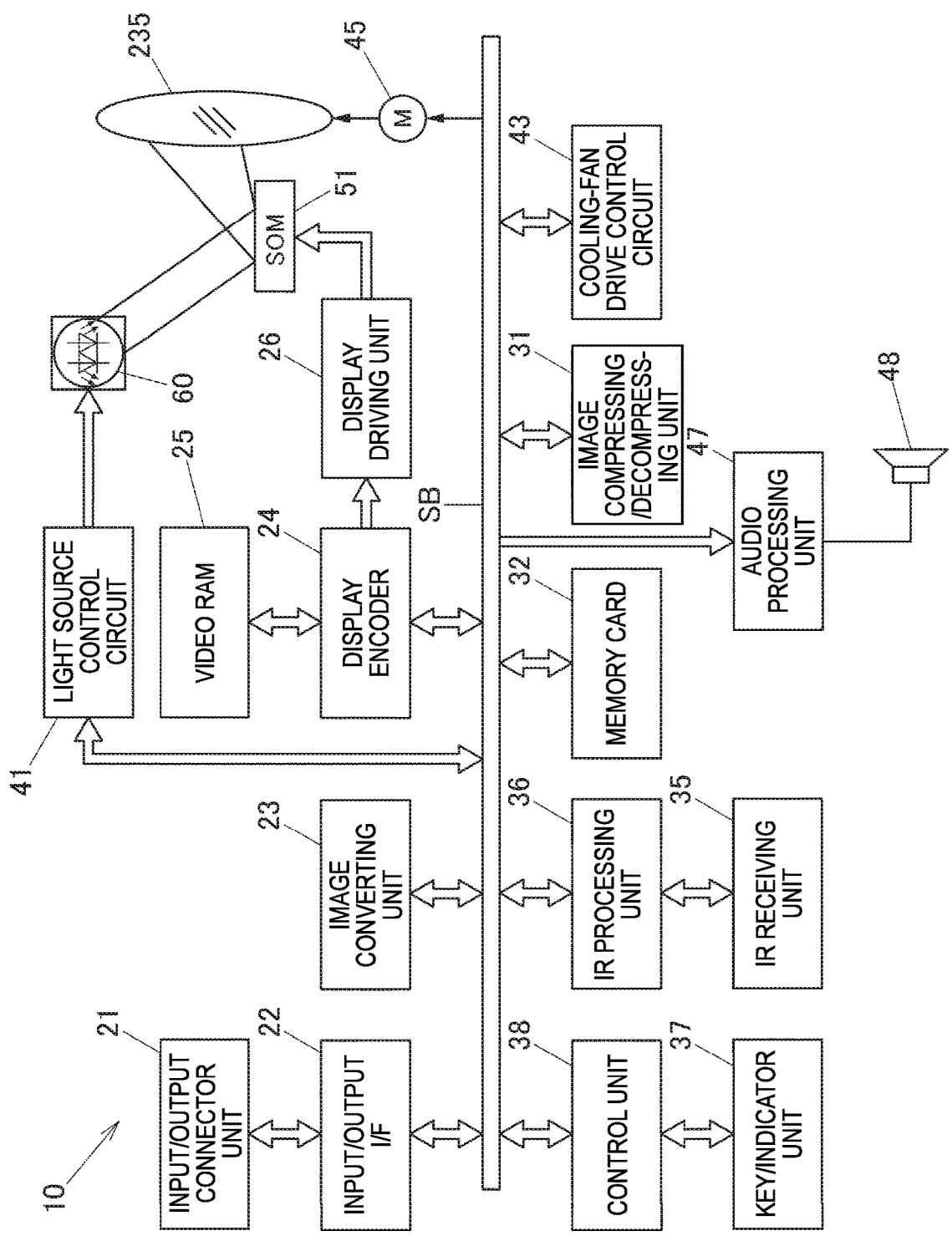
FIG. 1 is a view showing functional circuit blocks of a projector according to an embodiment of the present invention.

Hereinafter, an embodiment of the present invention will be described. FIG. 1 is a view showing functional circuit blocks of a projector 10. The projector 10 includes a projector control unit including a control unit 38, an input/output interface 22, an image converting unit 23, a display encoder 24, a display driving unit 26, or the like. Image signals of various standards input from an input/output connector unit 21 are transmitted via the input/output interface 22 and a system bus (SB), and are converted into image signals of a predetermined format suitable for display by the image converting unit 23, and are output to the display encoder 24.

After the input image signals are decompressed and are stored in a video RAM 25, the display encoder 24 generates video signals from contents stored in the video RAM 25, and outputs the video signals to the display driving unit 26.

The display driving unit 26 serves as a display element control unit. The display driving unit 26 drives a display element 51 which is a spatial optical modulator (SOM) at an appropriate frame rate corresponding to each image signal output from the display encoder 24. Then, the projector 10 irradiates the display element 51 with a flux of light emitted from a light source device 60 via an optical guiding system, thereby forming optical images by reflected light from the display element 51, and projects the images onto a screen (not shown) via a projection optical system to be described below. The projection optical system includes a movable lens group 235, which is driven for zoom adjustment and focus adjustment by a lens motor 45.

An image compressing/decompressing unit 31 performs data compression on luminance signals and color difference signals of the image signals by processing such as ADCT and Huffman encoding, and performs recording processing of sequentially writing the compressed data in a memory card 32 which is a portable recording medium. Further, in a reproduction mode, the image compressing/decompressing unit 31 reads out the image data stored in the memory card 32, and decompresses image data constituting a video in units of one frame. The image compressing/decompressing unit 31 outputs the decompressed image data to the display encoder 24 via the image converting unit 23, thereby making it possible to display the video or the like based on the image data stored in the memory card 32.

The control unit 38 controls the operations of individual circuits included in the projector 10, and includes a CPU, a ROM retaining operation programs such as various settings, a RAM usable as a work memory, or the like.

Operation signals of a key/indicator unit 37 provided on a top panel of a casing and including main keys, indicators, or the like are transmitted directly to the control unit 38. Key operation signals from a remote controller are received by an Ir receiving unit 35 and are demodulated into code signals by an Ir processing unit 36, and the code signals are output to the control unit 38.

The control unit 38 is connected to an audio processing unit 47 via the system bus (SB). The audio processing unit 47 includes a sound source circuit such as a PCM sound source. In a projection mode and the reproduction mode, the audio processing unit 47 converts audio data into analog data, and drives a speaker 48 to output amplified sound.

Further, the control unit 38 controls a light source control circuit 41 which is a light source control unit. The light source control circuit 41 individually controls the operation of an excitation light irradiation device 70 (see FIG. 2) of the light source device 60 such that light of predetermined wavelength bands required for image generation is emitted from the light source device 60. The light source control circuit 41 controls the timing of synchronization of a fluorescent wheel 101 or the like according to the projection mode based on an instruction from the control unit 38.

Further, the control unit 38 controls a cooling-fan drive control circuit 43 such that the cooling-fan drive control circuit 43 performs temperature detection using a plurality of temperature sensors provided in the light source device 60 or the like and controls the rotational speed of a cooling fan according to a result of the temperature detection. The control unit 38 controls the cooling-fan drive control circuit 43 such that the cooling-fan drive control circuit 43 keeps rotating the cooling fan by a timer or the like even after the power of a main body of the projector 10 is turned off, or performs control to turn off the power of the main body of the projector 10, or the like, according to the result of temperature detection by the temperature sensors.

Figure 2:
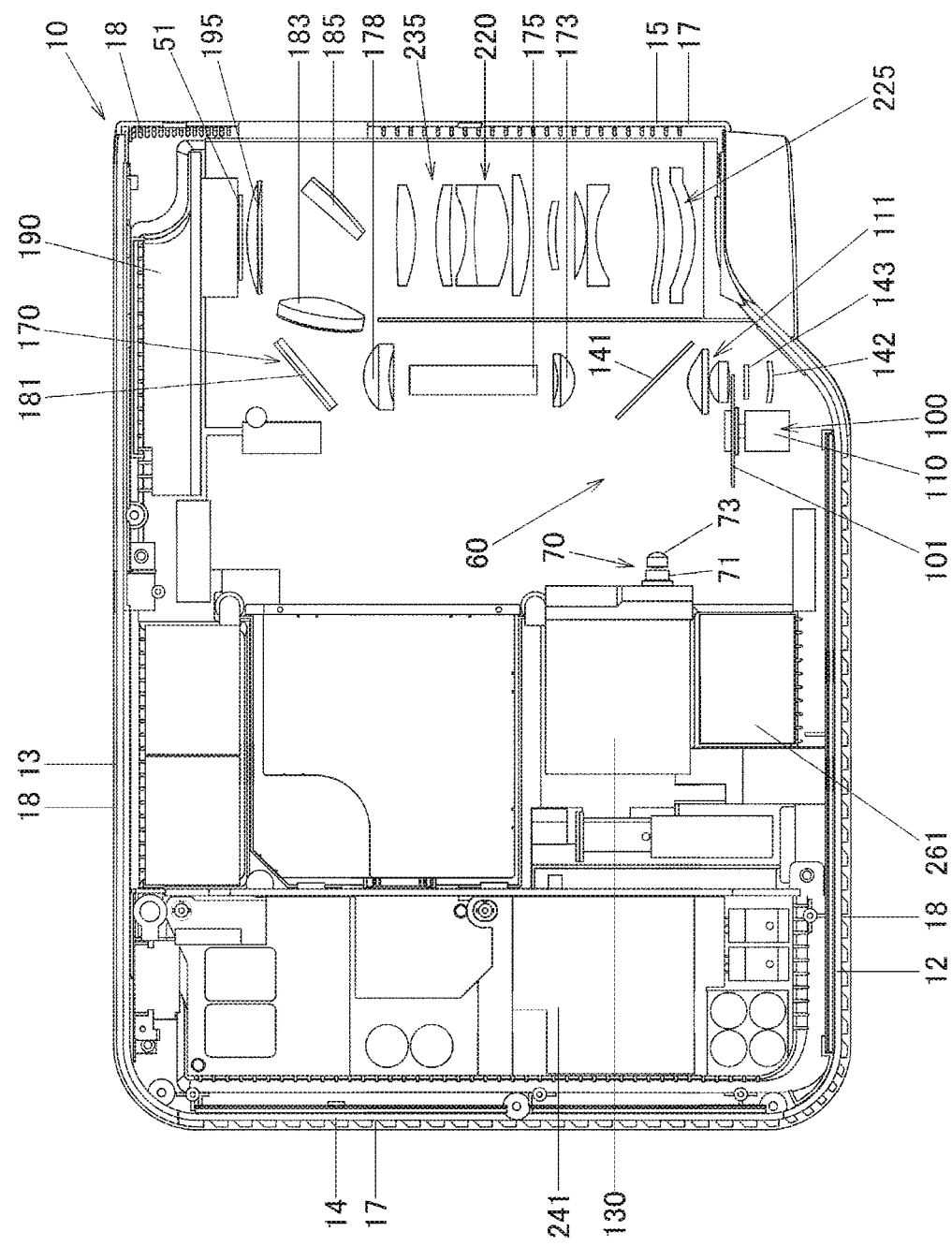
FIG. 2 is a top view schematically showing an inner structure of the projector according to the embodiment of the present invention.

FIG. 2 is a top view schematically showing an inner structure of the projector 10. The projector 10 includes a control circuit board 241 in the vicinity of a right panel 14. The control circuit board 241 includes a power supply circuit block, a light source control block, or the like. The projector 10 includes the light source device 60 in a substantially central front part of the casing of the projector 10.

Further, the projector 10 includes a light source optical system 170 and a projection side optical system 220.

The light source device 60 includes the excitation light irradiation device 70, a fluorescent wheel device 100, and a dichroic mirror 141. The dichroic mirror 141 is disposed on optical axes of light of wavelength bands of individual colors emitted from the excitation light irradiation device 70 and the fluorescent wheel device 100.

The excitation light irradiation device 70 includes blue laser diodes 71, a collimator lens 73, a heat sink 130, and a cooling fan 261. The blue laser diodes 71 are semiconductor light emitting elements disposed such that a rear panel 13 is parallel to optical axes. The blue laser diodes 71 emit substantially linearly polarized light of light of a blue wavelength band (light of a first wavelength band) to the dichroic mirror 141 as S-polarized light.

The collimator lens 73 is disposed on the optical axes of the blue laser diodes 71, and converts the light of the blue wavelength band emitted from the blue laser diodes 71 into parallel light so as to improve the directivity of the light.

The heat sink 130 is disposed on a right panel 14 side behind the blue laser diodes 71. The cooling fan 261 is disposed between the heat sink 130 and a front panel 12. The blue laser diodes 71 are cooled by the cooling fan 261 and the heat sink 130.

Figure 3:
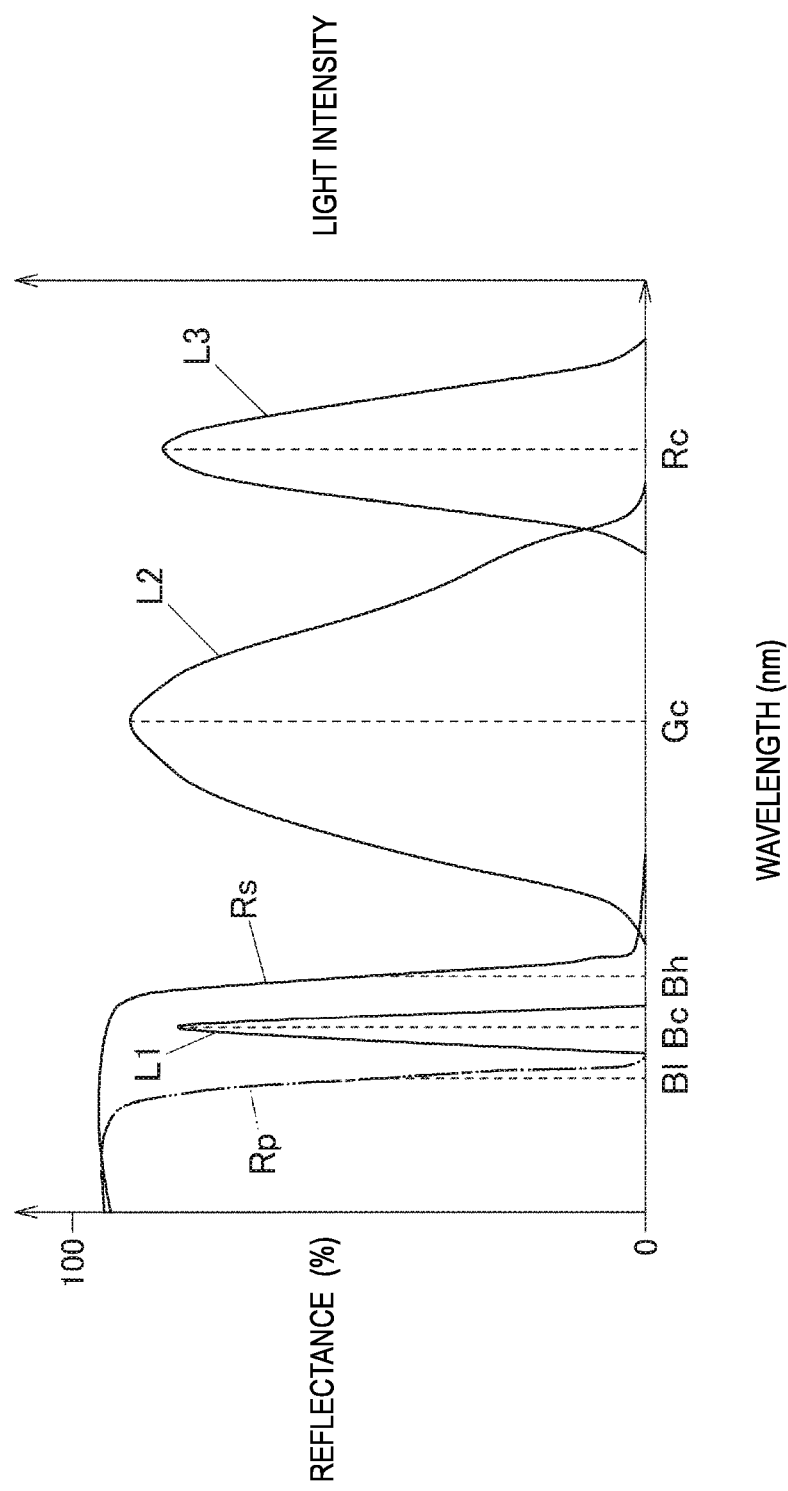
FIG. 3 is a view showing reflection characteristics of a dichroic mirror according to the embodiment of the present invention.

Here, reflection characteristics of the dichroic mirror 141 will be described. FIG. 3 shows distribution curves of light of a blue wavelength band L1, light of a green wavelength band L2, and light of a red wavelength band L3, a reflection characteristic Rs of an S-polarized component of the dichroic mirror 141, and a reflection characteristic Rp of a P-polarized component of the dichroic mirror 141. A left vertical axis in FIG. 3 represents the reflectance (%) of the reflection characteristic Rs of the S-polarized component and the reflection characteristic Rp of the P-polarized component, and a right vertical axis represents the light intensity of the light of the blue wavelength band L1, the light of the green wavelength band L2, and the light of the red wavelength band L3. The horizontal axis represents wavelength (nm). For example, a peak wavelength Bc of the light of the blue wavelength band L1 is 450 nm, a half-value wavelength B1 of the reflection characteristic Rp of the P-polarized component of the dichroic mirror 141 is 435 nm, and a half-value wavelength Bh of the reflection characteristic Rs of the S-polarized component of the dichroic mirror 141 is 465 nm. A peak wavelength Ge of the light of the green wavelength band L2 is 540 nm, and a peak wavelength Re of the light of the red wavelength band L3 is 620 nm.

As shown in the reflection characteristic of the S-polarized component Rs, the dichroic mirror 141 reflects most of the band on a short wavelength side and transmits most of the band on a long wavelength side of the S-polarized component. Further, as shown in the reflection characteristic Rp, the dichroic mirror 141 also reflects most of the band on a short wavelength side and transmits most of the band on a long wavelength side of the P-polarized component. The dichroic mirror 141 can reflect more bands on the long wavelength side of the S-polarized component than those of the P-polarized component. The dichroic mirror 141 of the present embodiment reflects the component in an S-polarized direction (a first polarization direction) and transmits the component in a P-polarized direction (a second polarization direction) of the light of the blue wavelength band L1.

Referring back to FIG. 2, the dichroic mirror 141 reflects most of the S-polarized light of the blue wavelength band emitted from the blue laser diodes 71, and guides the light to a fluorescent wheel 101 side. The reflected light of the blue wavelength band reflected by the dichroic mirror 141 is collected by a condensing lens group 111 and radiated onto the fluorescent wheel 101.

The fluorescent wheel 101 is disposed so as to be substantially parallel to the front panel 12, that is, so as to be orthogonal to an optical axis of incident light from the dichroic mirror 141. A motor 110 rotationally drives the fluorescent wheel 101. The condensing lens group 111 condenses the light of the blue wavelength band emitted from the excitation light irradiation device 70 on the fluorescent wheel 101 while condensing light emitted from the fluorescent wheel 101 in a direction of the rear panel 13.

Figure 4A:
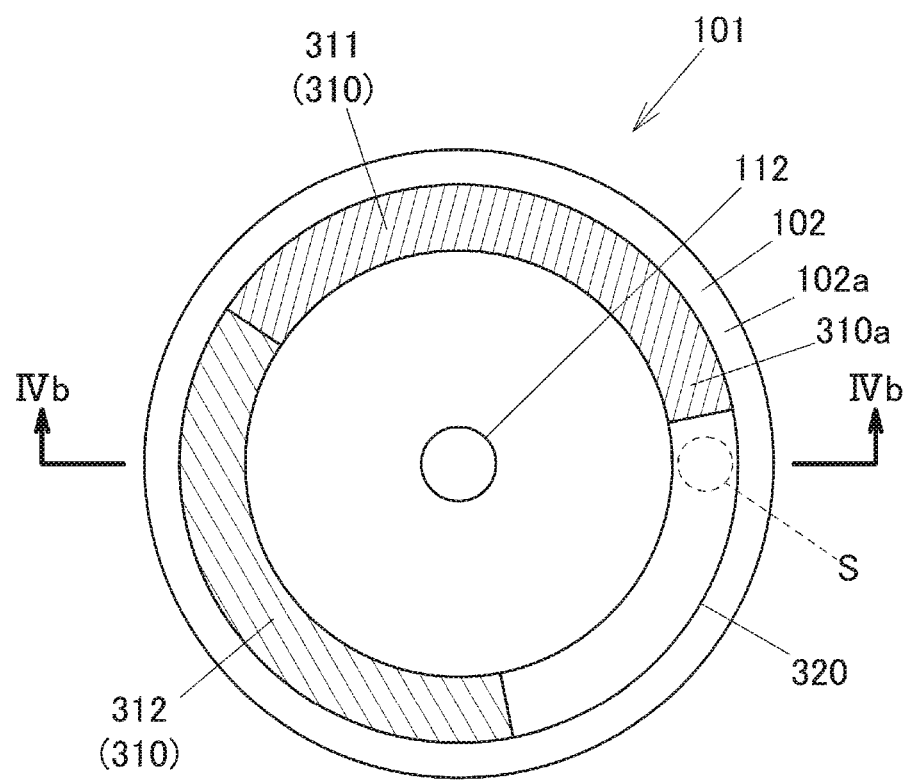
FIG. 4A is a schematic view of a fluorescent wheel device according to the embodiment of the present invention and shows a front view of a fluorescent wheel.

Here, the fluorescent wheel device 100 will be described. FIG. 4A is schematic view of the fluorescent wheel 101 as viewed from a front surface side (a side on which the excitation light of FIG. 2 is incident). The fluorescent wheel 101 is formed in a substantially disk shape. A central axis 112 of the fluorescent wheel 101 is fixed to a shaft portion of the motor 110 shown in FIG. 2. A base member 102 of the fluorescent wheel 101 may be formed of a metal such as copper or aluminum. The surface of the base member 102 on a dichroic mirror 141 side is a reflecting surface 102a which is mirror processed by silver deposition or the like.

The fluorescent wheel 101 includes a fluorescent area 310 which receives the light of the blue wavelength band as the excitation light and emits fluorescent light, and a transmission area 320 which transmits the light of the blue wavelength band in the vicinity of an outer peripheral edge. The fluorescence area 310 is formed on a reflecting surface 102a side, and includes a green fluorescent area 311 (a first fluorescent area) and a red fluorescent area 312 (a second fluorescent area). The green fluorescent area 311, the red fluorescent area 312, and the transmission area 320 are arranged side by side in a circumferential direction of the fluorescent wheel 101. The green fluorescent area 311, the red fluorescent area 312, and the transmission area 320 are each formed in an arc shape.

When the green fluorescent area 311 is irradiated with the light of the blue wavelength band which is emitted from the excitation light irradiation device 70 and which is reflected by the dichroic mirror 141, the light of the green wavelength band (the light of the second wavelength band) is emitted as fluorescent light. Further, when the red fluorescent area 312 is irradiated with the light of the blue wavelength band, the light of the red wavelength band (the light of the third wavelength band) whose wavelength band is adjacent to that of the light of the green wavelength band is emitted as fluorescent light. The transmission area 320 can be formed of a transparent material such as glass or plastic and transmits the incident light of the blue wavelength band.

Figure 4B:
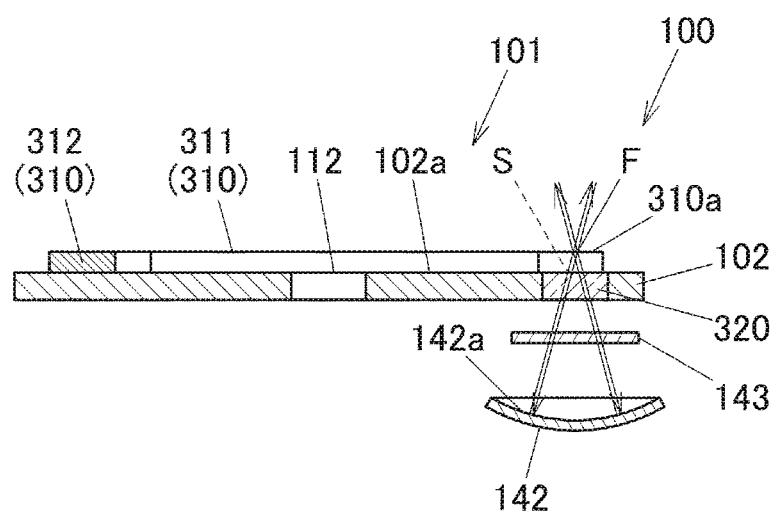
FIG. 4B is a schematic view of the fluorescent wheel device according to the embodiment of the present invention and shows a fluorescent wheel, a polarization conversion element, and a reflection member in a cross section taken along a line IVb-IVb of FIG. 4A.

FIG. 4B is a view showing the fluorescent wheel 101, a polarization conversion element 143, and a reflection member 142 in a cross section taken along a line IVb-IVb of FIG. 4A. The reflection member 142 and the polarization conversion element 143 are disposed on a side opposite to the side where the fluorescent area 310 of the fluorescent wheel 101 is formed. The reflection member 142 includes a reflecting surface 142a curved in a spherical shape around a position of a focal point F of the light of the blue wavelength band incident from the fluorescent wheel 101 side. Therefore, a radius of curvature of the reflecting surface 142a coincides with a distance from the focal point F to the reflecting surface 142a, In FIG. 4B, the position of the focal point F is near a surface 310a of the fluorescent area 310, but the position of the focal point F may be set to a position between the surface 310a of the fluorescent area 310 and the reflecting surface 102a or near the reflecting surface 102a. In order to prevent the luminous efficiency of the fluorescent area 310 from decreasing due to a high irradiation density of the light of the blue wavelength band, the position of the focal point F may be set to a position on the surface 310a slightly close to the condensing lens group 111 or a position lower than the reflecting surface 102a.

The polarization conversion element 143 is disposed between the fluorescent wheel 101 and the reflection member 142. The polarization conversion element 143 of the present embodiment is a ¼ wavelength plate that shifts a phase of the incident light of the blue wavelength band by ¼ wavelength. The S-polarized light of the blue wavelength band reflected by the dichroic mirror 141 of FIG. 2 is transmitted to a polarization conversion element 143 side if being radiated onto an area S of the transmission area 320. The light of the blue wavelength band emitted from the transmission area 320 is converted into circularly polarized light whose phase is shifted by ¼ wavelength by the polarization conversion element 143 and is transmitted to a reflection member 142 side. Since the reflecting surface 142a is formed in the spherical shape around the position of the focal point F, the reflection member 142 reflects the circularly polarized light of the blue wavelength band emitted from the polarization conversion element 143 to the polarization conversion element 143 side in substantially the same path as the incident path by setting an incident angle and a reflection angle as substantially 0°.

The polarization conversion element 143 shifts the phase of the circularly polarized light of the blue wavelength band reflected by the reflection member 142 by another ¼ wavelength and transmits the light to a transmission area 320 side. Accordingly, compared with the light of the blue wavelength band emitted from the transmission area 320 toward the polarization conversion element 143 side, the phase of the light of the blue wavelength band emitted toward the transmission area 320 side is shifted by ½ wavelength by the polarization conversion element 143, and the light becomes linearly polarized light whose the polarization direction rotated by 90°. Therefore, the light of the blue wavelength band incident on the transmission area 320 from the polarization conversion element 143 side is condensed by the condensing lens group 111 in FIG. 2, and incidents on the dichroic mirror 141 by P-polarized light.

The light of the green wavelength band emitted from the green fluorescent area 311 and the light of the red wavelength band emitted from the red fluorescent area 312 are also emitted toward the dichroic mirror 141 via the condensing lens group 111.

The dichroic mirror 141 transmits the light of the green wavelength band and the light of the red wavelength band emitted from the fluorescent wheel 101, and guides the light to the light source side optical system 170 as light source light. The dichroic mirror 141 transmits most of the P-polarized light of the blue wavelength band emitted from the fluorescent wheel 101 and guides the light to the light source side optical system 170 as light source light.

The light source side optical system 170 includes a condensing lens 173, a light tunnel 175 (a light guide device), a condensing lens 178, an optical-axis changing mirror 181, a condensing lens 183, an irradiation mirror 185, a condensing lens 195, or the like. The condensing lens 195 is also a part of the projection optical system 220 since the condensing lens 195 emits image light emitted from the display element 51 disposed on a side of the condensing lens 195 close to the rear panel 13 toward the projection optical system 220.

The condensing lens 173 is disposed in the vicinity of an entrance of the light tunnel 175, and condenses the light of the blue wavelength band, the light of the green wavelength band, and the light of the red wavelength band transmitted through the dichroic mirror 141. The light of the wavelength bands of the individual colors collected by the condensing lens 173 is emitted toward the light tunnel 175.

The optical-axis changing mirror 181 is disposed behind the condensing lens 178 which is on the optical axis on a side of the light tunnel 175 close to the rear panel 13. A flux of light emitted from an exit of the light tunnel 175 is condensed by the condensing lens 178, and then the optical axis is changed toward a left panel 15 side by the optical-axis changing mirror 181.

The flux of light reflected by the optical-axis changing mirror 181 is condensed by the condensing lens 183, and then is radiated onto the display element 51 at a predetermined angle through the condensing lens 195 by the irradiation mirror 185, In the present embodiment, a DMD is used as the display element 51. The display element 51 is cooled by a heat sink 190 provided on a rear panel 13 side.

The light source light radiated onto an image forming surface of the display element 51 by the light source side optical system 170 is reflected by the image forming surface of the display element 51, and projected onto the screen as projection light via the projection optical system 220. Here, the projection optical system 220 includes the condensing lens 195, the movable lens group 235, a fixed lens group 225, or the like. The movable lens group 235 is formed movably by a lens motor. The movable lens group 235 and the fixed lens group 225 are incorporated in a fixed lens barrel. Therefore, the fixed lens barrel including the movable lens group 235 is a variable focus lens, and is formed to be capable of performing zoom adjustment and focus adjustment.

By configuring the projector 10 as described above, when light is emitted from the excitation light irradiation device 70 while rotating the fluorescent wheel 101, the light of the red, green, and blue wavelength bands is incident on the display element 51 via the dichroic mirror 141 and the light source side optical system 170. Therefore, the DMD, which is the display element 51 of the projector 10, can project the color image on the screen by time-divisionally displaying the light of each color according to the data.

In the present embodiment, the transmission area 320 is formed by disposing an arc-shaped material, but the area provided with the transmission area 320 may be formed by a notch or a through hole. The transmission area 320 may be configured to diffuse and transmit the light of the blue wavelength band by providing a diffusion layer. Accordingly, the illuminance distribution of the light of the blue wavelength band can be made uniform. Since the reflection member 142 includes a curved reflecting surface 142a, the diffused and transmitted light of the blue wavelength band can re-enter the transmission area 320 toward the position of the focal point F.

Although one blue laser diode 71 is shown in FIG. 2 in the present embodiment, the excitation light irradiation device 70 may be an array-shaped light source where a plurality of blue laser diodes 71 are disposed.

Further, with reference to the dichroic mirror 141, the fluorescent wheel 101 may be disposed so as to face the blue laser diodes 71, and the light source side optical system 170 may be disposed in a reflection direction of the dichroic mirror 141. In this case, the dichroic mirror 141 transmits the P-polarized component of the light of the blue wavelength band emitted from the blue laser diodes 71, reflects the S-polarized component, and reflects the fluorescent light.

As described above, the light source device 60 and the projector 10 including the light source device 60 according to embodiment of the present invention include: the fluorescent wheel 101 where the fluorescent area 310 and the transmission area 320 are arranged side by side in the circumferential direction; the dichroic mirror 141 that is configured to reflect the component in the S-polarized direction (the first polarization direction) of the light of the first wavelength band emitted from the light emitting element (the blue laser diode 71) and transmit the component in the P-polarized direction (the second polarization direction) of the light of the first wavelength band; and the polarization conversion element 143 that is configured to transmit the light of the first wavelength band transmitted through the transmission area 320 and the light of the first wavelength band reflected by the reflection member 142, and convert the light of the first wavelength band in the S-polarized direction (the first polarization direction) into the P-polarized direction (the second polarization direction) or convert the light of the first wavelength band in the P-polarized direction (the second polarization direction) into the S-polarized direction (the first polarization direction).

Therefore, it is possible to prevent the fluorescent light without a need to convert the polarization direction from passing through the polarization conversion element 143 and generating a loss. Further, since the light of the first wavelength band is reflected by the reflection member 142 and the polarization conversion element 143 which are provided on a back surface side of the fluorescent wheel 101 after passing through the transmission area 320 and is combined with the fluorescent light by the dichroic mirror 141, the light source device 60 and the projector 10 having good color reproducibility can be obtained with a simple configuration with a small number of components.

In the light source device 60 where the first polarization direction is the S-polarized direction and the second polarization direction is the P-polarized direction, the dichroic mirror 141 transmits the fluorescent light when the light of the first wavelength band is S-polarized light and the dichroic mirror 141 reflects the fluorescent light when the light of the first wavelength band is P-polarized light, when a reflection efficiency in the S-polarized direction is better than that in the P-polarized direction, occurrence of optical path loss of the light of the first wavelength band can be reduced.

The light source device 60 where the polarization conversion element 143 is the ¼ wavelength plate can convert the polarization direction by 90° by causing the light of the first wavelength band to enter the polarization conversion element 143 twice. In the present embodiment, as compared with a case where the polarization conversion element 143 is provided near the focal point F on the fluorescent wheel 101, since the polarization conversion element 143 is provided between the fluorescent wheel 101 and the reflection member 142, it is possible to reduce the irradiation density by radiating light in a wide range and reduce deterioration of the polarization conversion element 143.

The light source device 60 where the reflecting surface 142a of the reflecting member 142 is curved in the spherical shape around the focal point F of the light of the first wavelength band radiated on the fluorescent wheel 101 can reliably cause the light in the second polarization direction to re-enter the transmission area 320, and efficiently utilize the light of the first wavelength band as light source light.

The light source device 60 where the fluorescent area 310 includes the first fluorescent area (the green fluorescent area 311) emitting the light of the second wavelength band and the second fluorescent area (the red fluorescent area 312) emitting the light of the third wavelength band can emit light of three types of wavelength bands from the fluorescent wheel 101 including the transmission area 320.

Further, the light source device 60 where the light of the first wavelength band is the light of the blue wavelength band, the light of the second wavelength band is the light of the green wavelength band, and the light of the third wavelength band is the light of the red wavelength band can form a color image.

Also, the above-described embodiments have been presented by way of example only, and are not intended to limit the scope of the inventions. The above-described novel embodiments may be embodied in a variety of other forms; furthermore, various omissions, substitutions and changes in the above-described embodiments may be made without departing from the spirit of the inventions. The above-described embodiments and modifications thereof are included in the scope and gist of the inventions, and are included in the scope of inventions disclosed in claims and equivalents of them.

What is claimed is:

1. A light source device comprising:
   a light emitting element that is configured to emit light of a first wavelength band;
   a fluorescent wheel that includes a fluorescent area configured to convert the light of the first wavelength band into fluorescent light and a transmission area configured to transmit the light of the first wavelength band, the fluorescent area and the transmission area being arranged side by side in a circumferential direction;
   a dichroic mirror that is configured to reflect a component in a first polarization direction of the light of the first wavelength band emitted from the light emitting element, to transmit a component in a second polarization direction of the light of the first wavelength band, and to transmit or reflect the fluorescent light, the second polarization direction being orthogonal to the first polarization direction of the light of the first wavelength band;
   a reflection member that is configured to reflect the light of the first wavelength band transmitted through the transmission area toward the transmission area; and
   a polarization conversion element that is disposed between the fluorescent wheel and the reflection member, configured to transmit the light of the first wavelength band transmitted through the transmission area and the light of the first wavelength band reflected by the reflection member, and configured to convert the light of the first wavelength band in the first polarization direction into the second polarization direction.

2. The light source device according to claim 1,
   wherein the first polarization direction is an S-polarized direction, and the second polarization direction is a P-polarized direction,
   wherein the dichroic mirror transmits the fluorescent light when the light of the first wavelength band is S-polarized light, and
   wherein the dichroic mirror reflects the fluorescent light when the light of the first wavelength band is P-polarized light.

3. The light source device according to claim 1,
   wherein the polarization conversion element is a ¼ wavelength plate.

4. The light source device according to claim 2,
   wherein the polarization conversion element is a ¼ wavelength plate.

5. The light source device according to claim 1,
   wherein a reflecting surface of the reflection member is curved in a spherical shape around a focal point of the light of the first wavelength band radiated on the fluorescent wheel.

6. The light source device according to claim 2,
   wherein a reflecting surface of the reflection member is curved in a spherical shape around a focal point of the light of the first wavelength band radiated on the fluorescent wheel.

7. The light source device according to claim 3,
   wherein a reflecting surface of the reflection member is curved in a spherical shape around a focal point of the light of the first wavelength band radiated on the fluorescent wheel.

8. The light source device according to claim 4,
   wherein a reflecting surface of the reflection member is curved in a spherical shape around a focal point of the light of the first wavelength band radiated on the fluorescent wheel.

9. The light source device according to claim 1,
   wherein the fluorescent area includes a first fluorescent area that emits light of a second wavelength band and a second fluorescent area that emits light of a third wavelength band.

10. The light source device according to claim 2,
    wherein the fluorescent area includes a first fluorescent area that emits light of a second wavelength band and a second fluorescent area that emits light of a third wavelength band.

11. The light source device according to claim 3,
    wherein the fluorescent area includes a first fluorescent area that emits light of a second wavelength band and a second fluorescent area that emits light of a third wavelength band.

12. The light source device according to claim 4,
    wherein the fluorescent area includes a first fluorescent area that emits light of a second wavelength band and a second fluorescent area that emits light of a third wavelength band.

13. The light source device according to claim 5,
    wherein the fluorescent area includes a first fluorescent area that emits light of a second wavelength band and a second fluorescent area that emits light of a third wavelength band.

14. The light source device according to claim 6,
    wherein the fluorescent area includes a first fluorescent area that emits light of a second wavelength band and a second fluorescent area that emits light of a third wavelength band.

15. The light source device according to claim 7,
    wherein the fluorescent area includes a first fluorescent area that emits light of a second wavelength band and a second fluorescent area that emits light of a third wavelength band.

16. The light source device according to claim 8,
    wherein the fluorescent area includes a first fluorescent area that emits light of a second wavelength band and a second fluorescent area that emits light of a third wavelength band.

17. The light source device according to claim 9,
    wherein the light of the first wavelength band is light of a blue wavelength band, wherein the light of the second wavelength band is light of a green wavelength band, and wherein the light of the third wavelength band is light of a red wavelength band.

18. The light source device according to claim 10, wherein the light of the first wavelength band is light of a blue wavelength band, wherein the light of the second wavelength band is light of a green wavelength band, and wherein the light of the third wavelength band is light of a red wavelength band.

19. A projector comprising:

the light source device according to claim 1;

a display element that is configured to be irradiated with source light from the light source device and to form image light;

a projection optical system that is configured to project the image light emitted from the display element onto a screen; and a control unit that is configured to control the display element and the light source device.

20. A projector comprising:

the light source device according to claim 2;

a display element that is configured to be irradiated with source light from the light source device and to form image light;

a projection optical system that is configured to project the image light emitted from the display element onto a screen; and a control unit that is configured to control the display element and the light source device.

* * * * *